(12) United States Patent
Shahriari et al.

(10) Patent No.: US 12,539,838 B2
(45) Date of Patent: Feb. 3, 2026

(54) SYSTEM AND METHOD OF ASSISTED EVASIVE STEERING

(71) Applicant: GM Global Technology Operations LLC, Detroit, MI (US)

(72) Inventors: Mohammadali Shahriari, Markham (CA); Reza Zarringhalam, Whitby (CA); Jackson Barry McGrory, Mississauga (CA); Abed Shammaa, Toronto (CA); Matan Yeger, Pardes Hanna-Karkur (IL); Khizar Ahmad Qureshi, Pickering (CA)

(73) Assignee: GM Global Technology Operations LLC, Detroit, MI (US)

( * ) Notice: Subject to any disclaimer, the term of this patent is extended or adjusted under 35 U.S.C. 154(b) by 177 days.

(21) Appl. No.: 18/441,159

(22) Filed: Feb. 14, 2024

(65) Prior Publication Data

US 2025/0256698 A1 Aug. 14, 2025

(51) Int. Cl.
*B60W 10/20* (2006.01)
*G05D 1/646* (2024.01)

(52) U.S. Cl.
CPC ............ *B60W 10/20* (2013.01); *G05D 1/646* (2024.01); *B60W 2710/207* (2013.01)

(58) Field of Classification Search
CPC . B60W 10/20; B60W 2710/207; G05D 1/646
USPC .......................................................... 701/41
See application file for complete search history.

(56) References Cited

U.S. PATENT DOCUMENTS

| 2019/0031202 A1* | 1/2019 | Takeda ................ B60T 8/17557 |
| 2024/0270237 A1* | 8/2024 | Yoda ..................... B60W 30/10 |

FOREIGN PATENT DOCUMENTS

| DE | 102011082478 A1 | 3/2013 |
| DE | 102016011282 A1 | 3/2018 |

\* cited by examiner

*Primary Examiner* — Yi-Kai Wang
(74) *Attorney, Agent, or Firm* — Honigman LLP; Matthew H. Szalach; Jonathan P. O'Brien (57) ABSTRACT

A computer-implemented method that, when executed by data processing hardware, causes the data processing hardware to perform operations comprising, determining vehicle pose data of a host vehicle, maintaining an odometry buffer with the vehicle pose data, detecting a steering maneuver of the host vehicle, determining a relative pose of the host vehicle upon initiation of the steering maneuver using the odometry buffer, formulating an odometry path for aligning a heading of the host vehicle with a heading of the relative pose, and completing the steering maneuver according to the odometry path.

20 Claims, 6 Drawing Sheets

SYSTEM AND METHOD OF ASSISTED EVASIVE STEERING

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates generally to a system and method for vehicle stabilization and, more particularly, to a system and method for vehicle stabilization after an evasive steering maneuver.

Vehicles are commonly equipped with advanced driver-assistance systems (ADAS), which can aid drivers with handling a vehicle. Maintaining good trajectory following or resuming trajectory following an evasive steering maneuver in a vehicle equipped with ADAS can be challenging in the absence of lane lines or when perception is degraded, for example. Shortcomings of existing systems and methods will be addressed by aspects of the present disclosure.

SUMMARY

In one configuration, a computer-implemented method that, when executed by data processing hardware, causes the data processing hardware to perform operations is provided. The operations include determining vehicle pose data of a host vehicle, maintaining an odometry buffer with the vehicle pose data, detecting a steering maneuver of the host vehicle, determining a relative pose of the host vehicle upon initiation of the steering maneuver using the odometry buffer, formulating an odometry path for aligning a heading of the host vehicle with a heading of the relative pose, and completing the steering maneuver according to the odometry path.

The method may include one or more of the following aspects. For example, gathering vehicle pose data may further include a first state, a second state, and a third state of the host vehicle. The first state may be an x-position of the host vehicle, the second state may be a y-position of the host vehicle, and the third state may be a heading of the host vehicle.

According to another aspect, determining the relative pose may include determining a heading of an initial pose of the host vehicle at a point in time prior to initiation of the steering maneuver.

In at least one example, completing the steering maneuver according to the odometry path may further include aligning the heading of the host vehicle with the heading of the relative pose.

According to at least one aspect, maintaining the odometry buffer may further include updating the odometry buffer according to a fail-operational mode due to hardware failure, sensor failure, or software failure. Updating the odometry buffer according to the fail-operational mode may include updating the odometry buffer with sensor data directly from a sensor system.

In another configuration, a vehicle management system is provided and includes an advanced driver assistance system including a trajectory control module associated with path planning and a steering control module, data processing hardware, and memory hardware in communication with the data processing hardware, the memory hardware storing instructions that, when executed on the data processing hardware, cause the data processing hardware to perform operations. The operations include determining vehicle pose data of a host vehicle, maintaining an odometry buffer with the vehicle pose data, detecting a steering maneuver of the host vehicle, determining a relative pose of the host vehicle upon initiation of the steering maneuver using the odometry buffer, formulating an odometry path for aligning a heading of the host vehicle with a heading of the relative pose, and completing the steering maneuver according to the odometry path.

The vehicle management system may include one or more of the following aspects. For example, gathering vehicle pose data may further include a first state, a second state, and a third state of the host vehicle. The first state may be an x-position of the host vehicle, the second state may be a y-position of the host vehicle, and the third state may be a heading of the host vehicle.

In at least one example, determining the relative pose may include determining a heading of an initial pose of the host vehicle at a point in time prior to initiation of the steering maneuver.

According to at least one aspect, completing the steering maneuver according to the odometry path may further include aligning the heading of the host vehicle with the heading of the relative pose.

According to another aspect, maintaining the odometry buffer may further include updating the odometry buffer according to a fail-operational mode due to hardware failure, sensor failure, or software failure. Updating the odometry buffer according to the fail-operational mode may include updating the odometry buffer with sensor data directly from a sensor system.

In another configuration, a computer-implemented method that, when executed by data processing hardware, causes the data processing hardware to perform operations is provided. The operations including receiving sensor data from one or more wheel speed sensors and an inertial measurement unit of a host vehicle, maintaining an initial pose of the vehicle in an odometry buffer of an odometry memory, providing the initial pose to one or more modules for path planning of the host vehicle, and formulating an odometry path for stabilizing the host vehicle, wherein the odometry path is formulated with a relative pose respective of the initial pose.

The method may include one or more of the following aspects. For example, maintaining the initial pose data may further include a first state, a second state, and a third state of the host vehicle. The first state may be an x-position of the host vehicle, the second state may be a y-position of the host vehicle, and the third state may be a heading of the host vehicle.

According to at least one aspect, formulating the odometry path further includes localizing a breadcrumb path to a coordinate frame of the host vehicle.

According to yet another aspect, the method may further include transforming the breadcrumb path from a target vehicle to the host vehicle.

In yet another configuration, a system is provided and includes data processing hardware and memory hardware in communication with the data processing hardware, the memory hardware storing instructions that, when executed on the data processing hardware, cause the data processing hardware to perform operations. The operations include determining vehicle pose data of a host vehicle, maintaining an odometry buffer with the vehicle pose data, detecting a steering maneuver of the host vehicle, determining a relative pose of the host vehicle upon initiation of the steering maneuver using the odometry buffer, formulating an odometry path for aligning a heading of the host vehicle with a heading of the relative pose, and completing the steering maneuver according to the odometry path.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

In this application, including the definitions below, the term "module" may be replaced with the term "circuit." The term "module" may refer to, be part of, or include an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor (shared, dedicated, or group) that executes code; memory (shared, dedicated, or group) that stores code executed by a processor; other suitable hardware components that provide the described functionality; or a combination of some or all of the above, such as in a system-on-chip.

The term "code," as used above, may include software, firmware, and/or microcode, and may refer to programs, routines, functions, classes, and/or objects. The term "shared processor" encompasses a single processor that executes some or all code from multiple modules. The term "group processor" encompasses a processor that, in combination with additional processors, executes some or all code from one or more modules. The term "shared memory" encompasses a single memory that stores some or all code from multiple modules. The term "group memory" encompasses a memory that, in combination with additional memories, stores some or all code from one or more modules. The term "memory" may be a subset of the term "computer-readable medium." The term "computer-readable medium" does not encompass transitory electrical and electromagnetic signals propagating through a medium, and may therefore be considered tangible and non-transitory memory. Non-limiting examples of a non-transitory memory include a tangible computer readable medium including a nonvolatile memory, magnetic storage, and optical storage.

The apparatuses and methods described in this application may be partially or fully implemented by one or more computer programs executed by one or more processors. The computer programs include processor-executable instructions that are stored on at least one non-transitory tangible computer readable medium. The computer programs may also include and/or rely on stored data.

A software application (i.e., a software resource) may refer to computer software that causes a computing device to perform a task. In some examples, a software application may be referred to as an "application," an "app," or a "program." Example applications include, but are not limited to, system diagnostic applications, system management applications, system maintenance applications, word processing applications, spreadsheet applications, messaging applications, media streaming applications, social networking applications, and gaming applications.

The non-transitory memory may be physical devices used to store programs (e.g., sequences of instructions) or data (e.g., program state information) on a temporary or permanent basis for use by a computing device. The non-transitory memory may be volatile and/or non-volatile addressable semiconductor memory. Examples of non-volatile memory include, but are not limited to, flash memory and read-only memory (ROM)/programmable read-only memory (PROM)/erasable programmable read-only memory (EPROM)/electronically erasable programmable read-only memory (EEPROM) (e.g., typically used for firmware, such as boot programs). Examples of volatile memory include, but are not limited to, random access memory (RAM), dynamic random access memory (DRAM), static random access memory (SRAM), phase change memory (PCM) as well as disks or tapes.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Various implementations of the systems and techniques described herein can be realized in digital electronic and/or optical circuitry, integrated circuitry, specially designed ASICS (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

The processes and logic flows described in this specification can be performed by one or more programmable processors, also referred to as data processing hardware, executing one or more computer programs to perform functions by operating on input data and generating output. The processes and logic flows can also be performed by special purpose logic circuitry, e.g., an FPGA (field programmable gate array) or an ASIC (application specific integrated circuit). Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Figure 1:
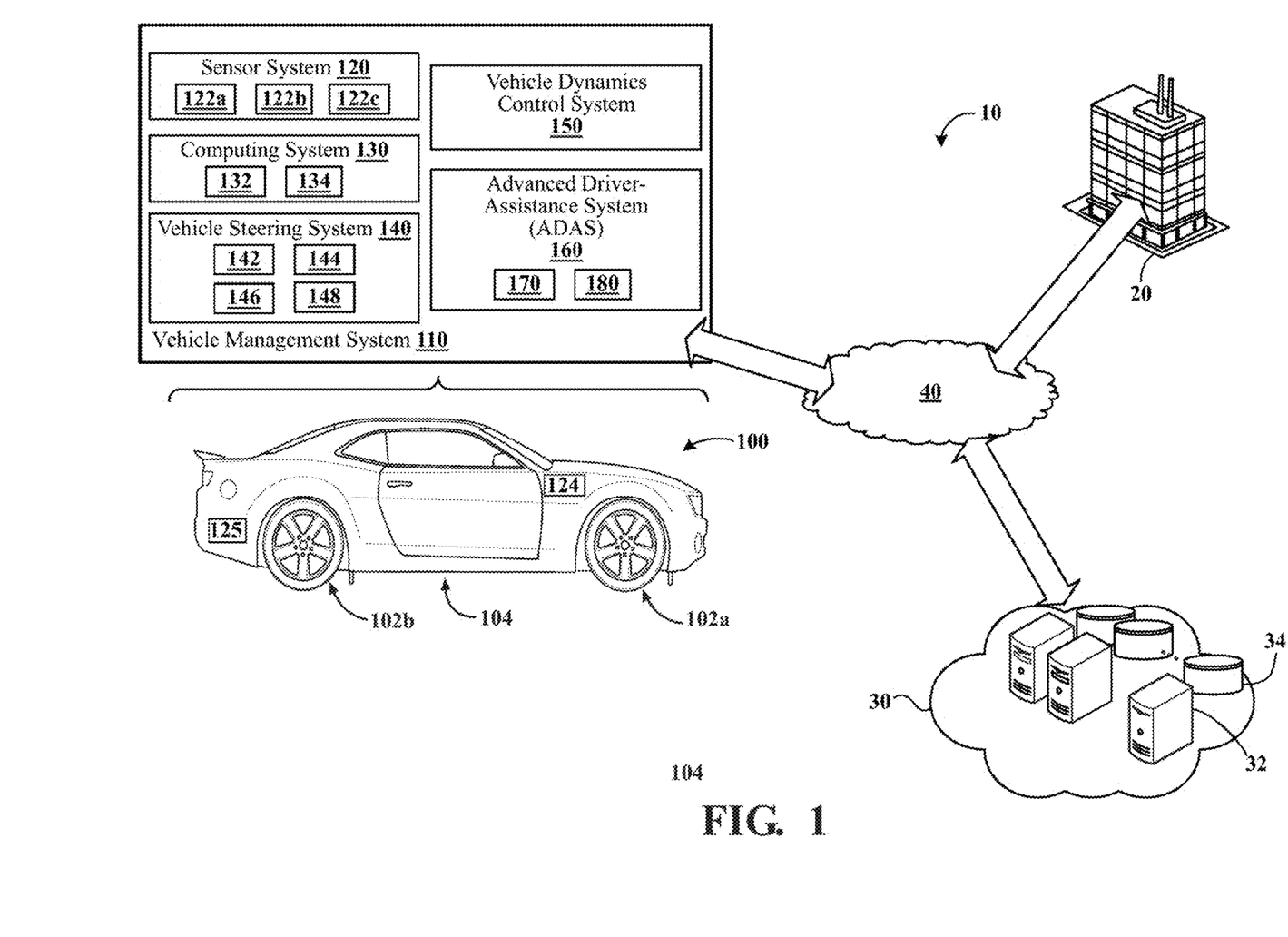
FIG. 1 is a schematic diagram of a vehicle environment including a vehicle management system according to the principles of the present disclosure.

Referring to FIG. 1, an example vehicle operating environment 10 is provided for illustration of the principles of the present disclosure. The vehicle operating environment 10 includes a vehicle 100 and a vehicle service center 20. For the sake of illustration, the vehicle operating environment 10 is shown as including a single vehicle service center 20. However, in other examples, the vehicle operating environment 10 may include a plurality of vehicle service centers 20 in communication over a network 40 (e.g., the Internet, cellular networks).

The vehicle 100 includes a vehicle management system 110 including a sensor system 120, a computing system 130, a steering system 140, a vehicle dynamics system 150, and an advanced driver-assistance system (ADAS) 160. While the vehicle 100 maneuvers about the environment 10, the sensor system 120 includes various sensor subsystems 122, 122*a*-122*c* configured to gather sensor data 123, 123*a*-123*c* relating to characteristics of the environment 10 and/or a status of the vehicle 100. For instance, the sensor subsystems 122 include a vehicle exterior sensor subsystem 122*a* configured to measure or obtain external environmental data 123*a*, such as weather or surrounding objects (e.g., vehicles, pedestrians, etc.), an interior sensor subsystem 122b configured to measure interior environmental data 123b, such as vehicle occupancy, and/or an ADAS sensor subsystem 122c configured to measure or obtain vehicle operating data 123c, such as operating parameters. The ADAS sensor subsystem 122c can include an inertial measurement unit (IMU) 124, one or more wheel speed sensors 125, as well as other sensors for obtaining vehicle operating data 123c. As the sensor system 120 gathers the sensor data 123, a computing system 130 is configured to store, process, and/or communicate the sensor data 123 within the vehicle operating environment 10. In order to perform computing tasks related to the sensor data 123, the computing system 130 of the vehicle 100 includes data processing hardware 132 and memory hardware 134. The data processing hardware 132 is configured to execute instructions stored in the memory hardware 134 to perform computing tasks related to operation and management of the vehicle 100. Generally speaking, the computing system 130 refers to one or more locations of data processing hardware 132 and/or memory hardware 134.

In some examples, the computing system 130 is a local system located on the vehicle 100 (e.g., vehicle control unit). When located on the vehicle 100, the computing system 130 may be centralized (i.e., in a single location/area on the vehicle 100, for example, a vehicle control unit), decentralized (i.e., located at various locations about the vehicle 100), or a hybrid combination of both (e.g., with a majority of centralized hardware and a minority of decentralized hardware). To illustrate some differences, a decentralized computing system 130 may allow processing to occur at an activity location while a centralized computing system 130 may allow for a central processing hub that communicates to systems located at various positions on the vehicle 100.

Additionally or alternatively, the computing system 130 includes computing resources that are located remotely from the vehicle 100. For instance, the computing system 130 may communicate via the network 40 with a remote vehicle computing system 30 (e.g., a remote computer/server or a cloud-based environment). Much like the computing system 130, the remote vehicle computing system 30 includes remote computing resources such as remote data processing hardware 32 and remote memory hardware 34. Here, sensor data 123 or other processed data (e.g., data processed locally by the computing system 130) may be stored in the remote vehicle computing system 30 and may be accessible to the computing system 130. In some examples, the computing system 130 is configured to utilize the remote resources 32, 34 as extensions of the computing resources 132, 134 such that resources of the computing system 130 may reside on resources of the remote vehicle computing system 30.

With reference to FIG. 1, one or more wheels 102 (i.e., front wheels 102a and rear wheels 102b) are coupled to a suspension 104 the vehicle 100. The steering system 140 is capable of monitoring and controlling the position and/or direction of the wheels 102. For instance, the steering system 140 can include a steering column 142 coupled to the suspension 104 and a steering wheel 144 coupled to the steering column 142. The steering system 140 may include one or more additional components such as a steering box 146 and steering gear 148 so that torque can be applied to the steering column 142, whether that be by a motor coupled to the steering column 142 or by a driver through the steering wheel 144, to maintain control and position of the front wheels 102a.

Figure 2:
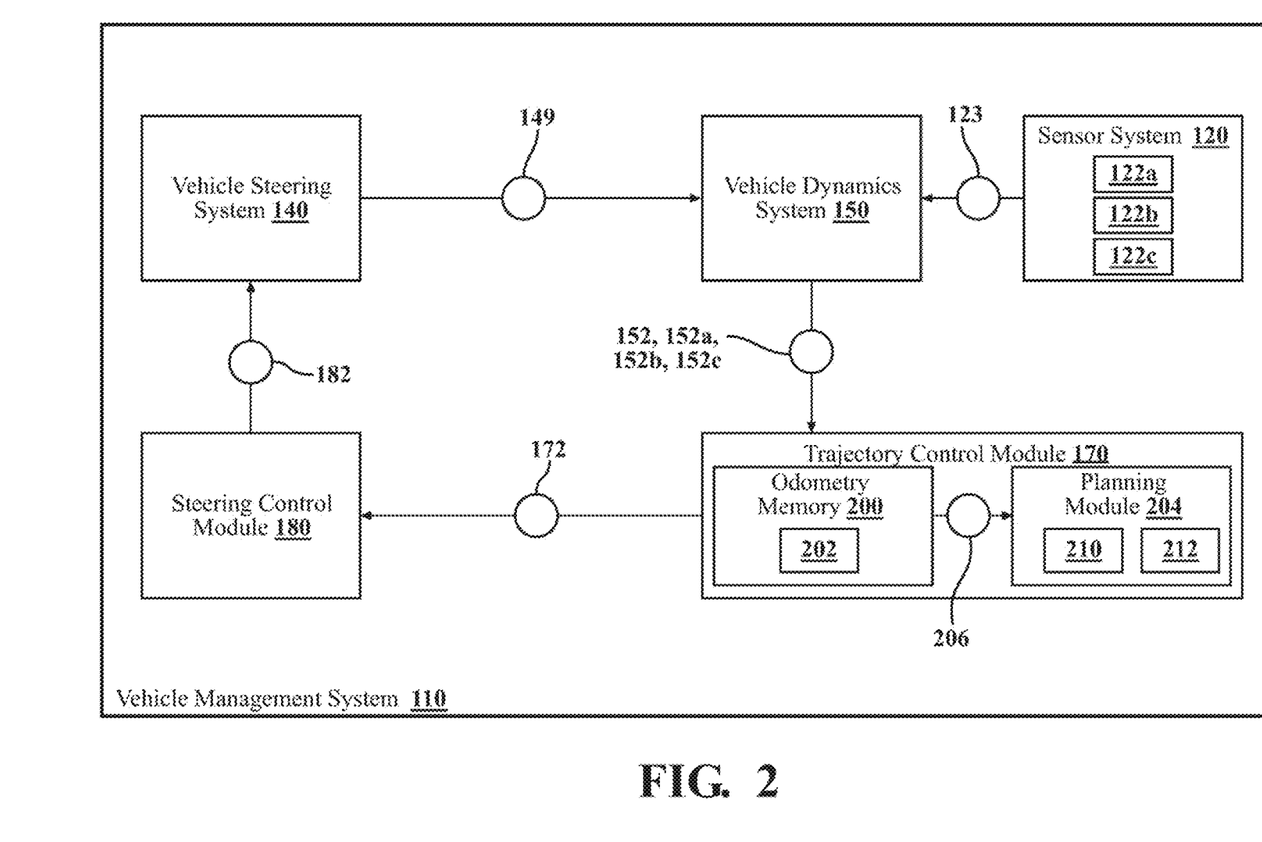
FIG. 2 is an enlarged schematic diagram showing an example of the vehicle management system according to the principles of the present disclosure.

The vehicle dynamics control system 150 is capable of monitoring and controlling one or more electronic aspects of the vehicle 100, such as continuously monitoring and/or controlling a position or pose 152 of the vehicle 100, as shown in FIG. 2. The steering system 140 can provide an actual road wheel angle 149 as an input to the vehicle dynamics control system 150 which can change the pose 152 of the vehicle 100. The pose 152 can include a first state (e.g., x-position) 152a, a second state (e.g., a y-position) 152b, and a third state (e.g., a heading) 152c, for example.

The ADAS 160 is capable of monitoring and controlling one or more electronic aspects of the vehicle 100. For instance, the ADAS 160 can monitor and control one or more subsystems of the vehicle 100, such as the steering system 130. In other words, the ADAS 160 can communicate with the steering system 130 to maintain a good trajectory of the vehicle 100 or resume trajectory following an evasive steering maneuver, for example. Stabilizing the vehicle 100 after an evasive maneuver can be challenging when construction and knowledge of the environment (i.e., perception) is degraded but is desirable in order to avoid additional hazards as the vehicle 100 continues on its path. The ADAS 160 may include one or more modules for evaluating and/or storing sensor data 123 of the sensor system 120 and providing instructions to one or more of the systems (e.g., the steering system 140) of the vehicle 100 to maintain good trajectory following an evasive maneuver. For instance, the ADAS 160 may include a trajectory control module 170 and a steering control module 180.

The trajectory control module 170 can receive the pose 152, 152a-152c from the vehicle dynamics control system 150 and calculate a commanded steering angle 172. The commanded steering angle 172 can be provided to the steering control module 180 for calculating a torque 182 for the vehicle steering system 140. The vehicle steering system 140 can receive and apply the calculated torque 182 to modify the road wheel angle 149 accordingly. The trajectory control module 170 may include an odometry memory 200 which can store (i.e., save, record, etc.) the pose 152 of the vehicle 100 as it travels, for example. The odometry memory 200 may be desirable for stabilizing the vehicle 100 when perception of the environment is degraded (e.g., lane lines are not perceived). The odometry memory 200 may also be desirable for enhancing robustness of perception of the environment when perception is generally unaffected (e.g., lane lines are perceived). The odometry memory 200 can use sensor data 123, such as data 123c from the ADAS sensor subsystem 122c, and/or pose 152 from the vehicle dynamics control system 150 to estimate a change in position over time and formulate a path for stabilizing the vehicle 100, for example. In other words, the odometry memory 200 can update or continuously maintain an odometry buffer 202 with the pose 152 of the vehicle 100 as it travels so that trace details may be recalled during evasive and/or dynamic steering maneuvers and improve robust collision avoidance.

The trajectory control module 170 may further include a planning module 204 for determining a path of the vehicle 100. The planning module 204 may be configured to receive an initial pose 206 from the odometry memory 200 and, more particularly, from the odometry buffer 202. The initial pose 206 may be referred to as the pose 152 of the vehicle 100 on a first path 208 (FIG. 3) at time $t_0$ or at a time immediately before an evasive steering maneuver is detected by the vehicle 100. The planning module 204 may determine an eventual or relative pose 210 with respect to the initial pose 206. In other words, the planning module 204 can be configured to determine the relative pose 210 at time $t_n$, had the vehicle 100 not initiated an evasive steering maneuver. A final pose 212 may be used to refer to the pose 152 of the vehicle 100 when the heading 152c of the vehicle aligns with a heading 210c of the relative pose 210.

As will be discussed in examples below, the odometry memory 200 and/or the odometry buffer 200 may be maintained with the pose 152 and accessed by the planning module 204 so that a second or odometry path 214 may be formulated for stabilizing the vehicle after initiation of the evasive steering maneuver. In practical terms, the odometry path 214 may be desirable so that a heading 212c of the vehicle 100 can match the heading 210c of the relative pose 210. More particularly, the commanded steering angle 172 may be determined based on the odometry path 214 so that the heading 212c of the vehicle 100 can match the heading 210c of the relative pose 210. In general, without the odometry memory 200, the vehicle 100 would otherwise follow an evasive path 216 that can result in uncontrolled lane excursion, for example.

In the event that sensor data is uncertain, for instance, due to sensor failure, hardware failure, and/or software failure, the odometry buffer 202 may operate in a fail-operational mode. For example, if an odometry filter of the ADAS 160 that collects and filters sensor data from the sensor system 120 is not converging and/or anomalies are detected in the data, the odometry buffer 202 may operate in the fail-operational mode. During the fail-operational mode, the odometry buffer 202 may be updated according to the sensor data that is received at the ADAS sensor system (i.e., directly from sensors), for example, rather than taking data from the odometry filter. Once the vehicle 100 recovers from the fail-operational mode (i.e., the sensor data is no longer uncertain), the odometry buffer 202 continues consuming data from the odometry filter.

Figure 3:
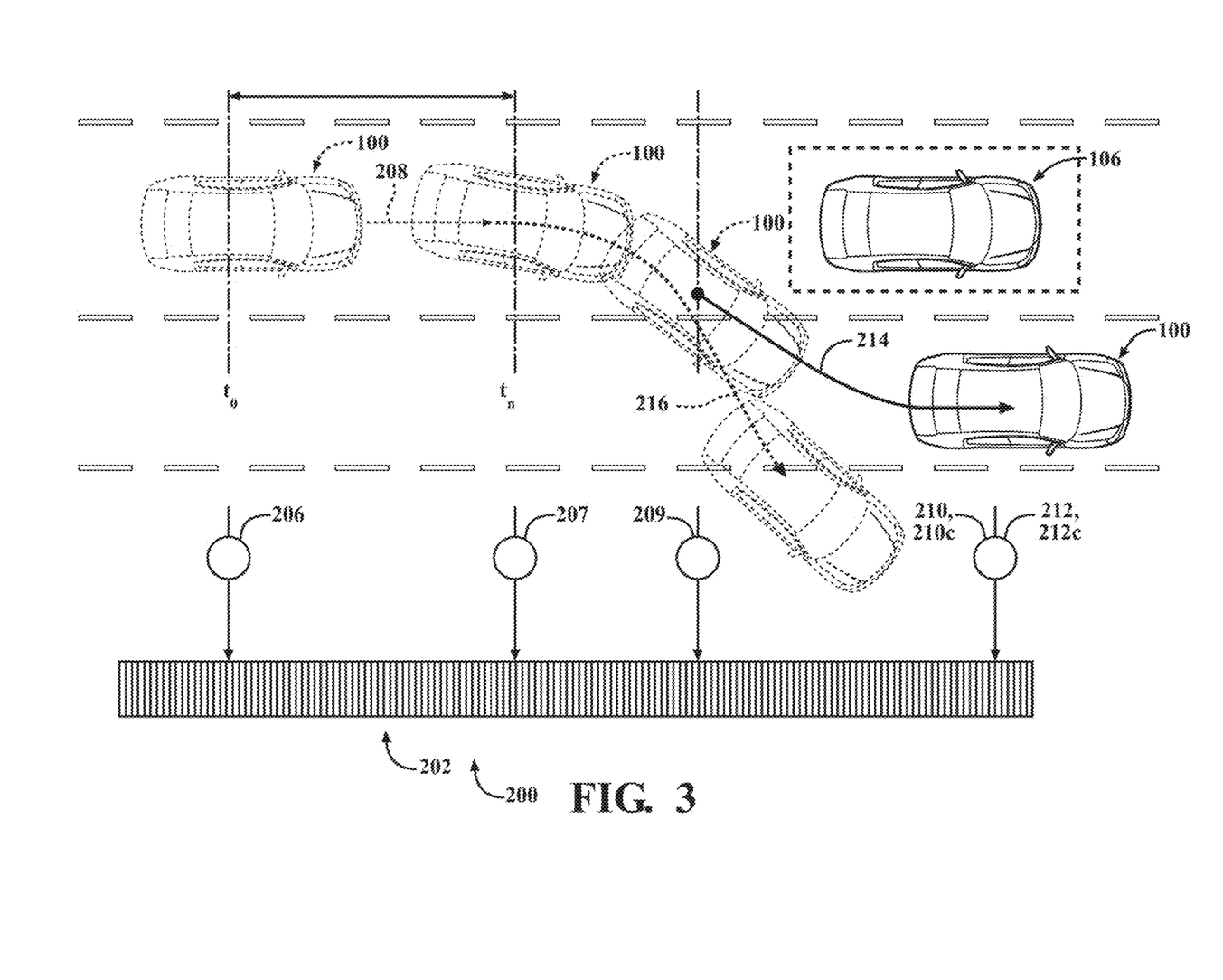
FIG. 3 is a top view of the vehicle of FIG. 1 completing a steering maneuver around an object according to the principles of the present disclosure.

With reference to FIG. 3, the vehicle 100 is shown completing an evasive maneuver around an object 106 (e.g., a vehicle, pedestrian, etc.). As mentioned above, the vehicle 100 typically would follow the evasive path 216 to evade the object 106. Here, however, the vehicle 100 can follow the odometry path 214 so that the heading 212c of the vehicle can align with the heading 210c of the relative pose 210. In other words, vehicle 100 can follow the odometry path 214 so that the heading 212c of the final pose 212 is commensurate with heading 210c of the relative pose 210. Between the initial pose 206 and the final pose 212, the vehicle may have one or more additional poses 207, 209 that can be stored (i.e., recorded, saved, etc.) in the odometry memory 200 and, more particularly, in the odometry buffer 202. Continuously maintaining the odometry buffer 202 with the pose 152 of the vehicle 100 may be desirable so that the planning module 204 can access trace details concerning the position of the vehicle 100 and modify the odometry path 214 accordingly, for example.

Figures 4A, 5A:
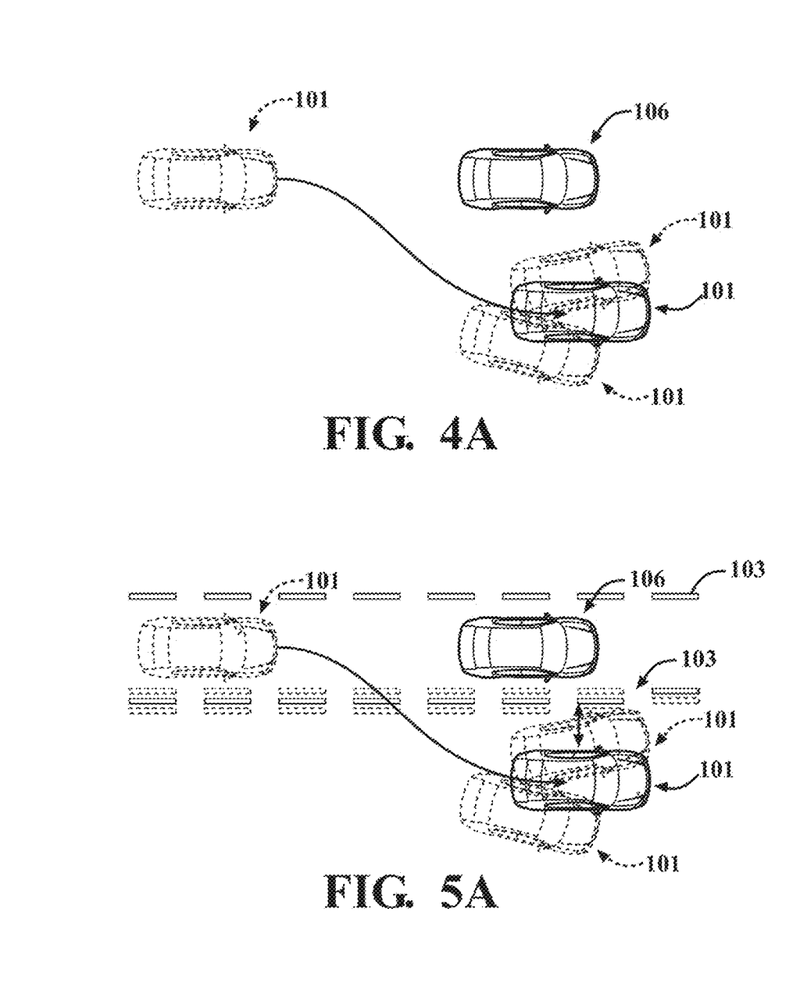
FIG. 4A is a top view of a prior vehicle attempting to complete a steering maneuver around an object with no nearby lane markings.
FIG. 5A. is a top view of a prior vehicle attempting to complete a steering maneuver around an object with respect to nearby lane markings.
Figure 4B:
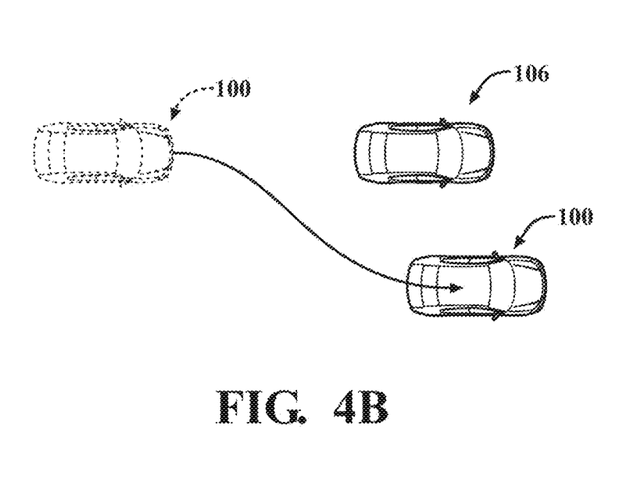
FIG. 4B is a top view of the vehicle of FIG. 1 completing a steering maneuver around an object with no nearby lane markings according to the principles of the present disclosure.
Figure 5B:
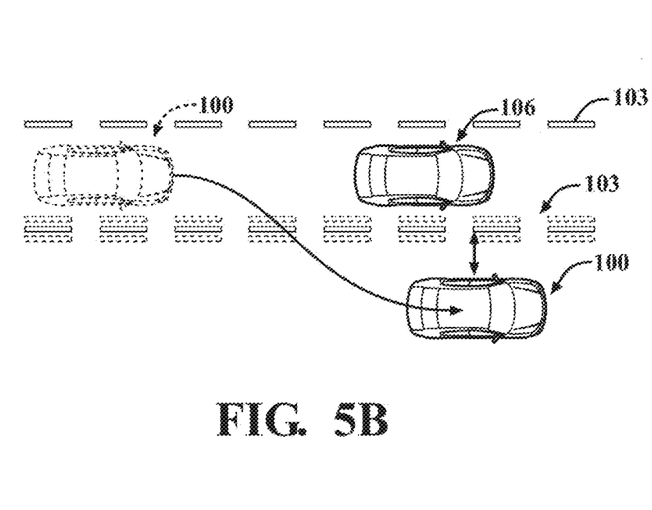
FIG. 5B is a top view of the vehicle of FIG. 1 completing a steering maneuver around an object with respect to nearby lane markings and according to the principles of the present disclosure.

With reference to FIG. 4A, prior vehicles 101 typically become unstable during evasive steering maneuvers around the object 106, and even more so when the prior vehicles 101 attempt evasive steering maneuvers without lane lines. In contrast, with reference to FIG. 4B, when the vehicle 100 relies on the odometry memory 200 (FIGS. 2 and 3) to formulate the odometry path 214, stability of the vehicle 100 may be maintained while completing the evasive steering maneuver. With reference to FIG. 5A, during evasive steering maneuvers, degradation of perception (i.e., loss of lane lines 103) is possible and prior vehicles 101 typically become unstable during such maneuvers. In contrast, with reference to FIG. 5B, when the vehicle 100 relies on the odometry memory 200 (FIGS. 2 and 3) to formulate the odometry path 214 and the vehicle 100 may be localized using nearby lane lines 103, stability of the vehicle 100 may be maintained so that the final heading 212c aligns with the relative heading 210c based on the initial heading 204c.

According to another aspect of the present disclosure, the odometry memory 200 may be implemented with a model predictive controller (MPC). In other words, the odometry memory 200 can be configured to provide the MPC with a pose of the vehicle 100 so that the commanded steering angle may be calculated and controlled according to the odometry path and a reference path, for example.

Figure 6:
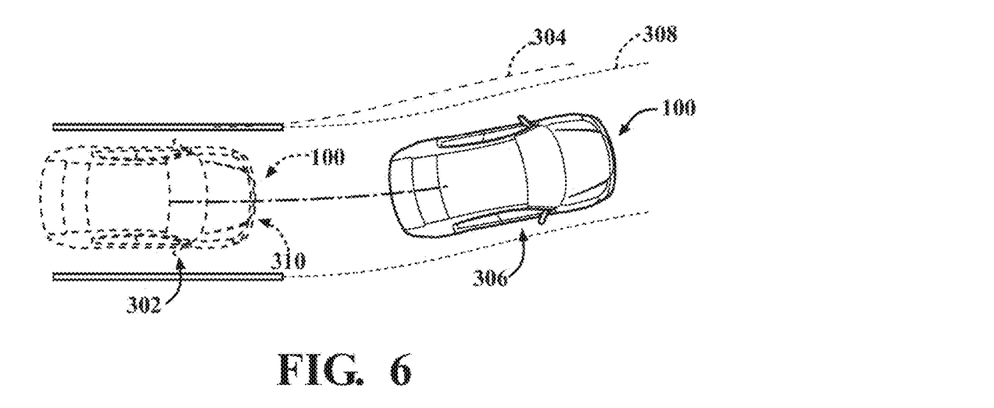
FIG. 6 is a top view of the vehicle of FIG. 1 at a first state and at a second state according to principles of the present disclosure.

With reference to FIG. 6, the vehicle 100 is shown at a first sample time 302 with respect to a first lane marking 304 and at a second sample time 306 with respect to a second lane marking 308. It may be desirable to fuse the first lane marking 304 and the second lane marking 308 so that the first lane marking 304 and the second lane marking 308 may be filtered, for example. To do so, the first lane marking 304 and the second lane marking 308 can be transformed so that they are on the same coordinate frame. In this example, the odometry memory 200 may provide a diametric pose 310 of the vehicle 100 so the first lane marking 304 and the second lane marking 310 can be transformed to the same coordinate frame.

Figure 7:
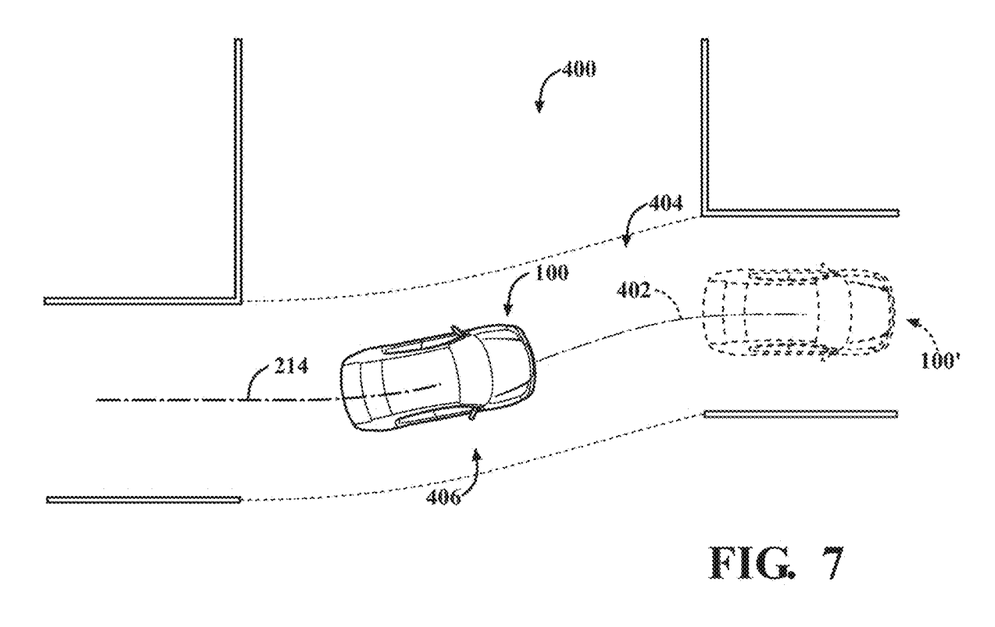
FIG. 7 is a top view of the vehicle of FIG. 1 following a breadcrumb path to a target vehicle according to the principles of the present disclosure.

With reference to FIG. 7, the vehicle 100 is shown traveling through an intersection 400 along a breadcrumb path 402. The odometry memory 200 may be accessed so that the trajectory control module 170 and, more particularly, the planning module 204, can form the breadcrumb path 402 on the road 404 from a target vehicle 100' to the vehicle 100. For instance, it may be desirable to reference the initial pose 206 of the vehicle 100 to establish the odometry path 214 and localize the breadcrumb path 402 to a coordinate frame 406 of the vehicle 100. Then, the breadcrumb path 402 may be back transformed from the target vehicle 100' to the vehicle 100.

Figure 8:
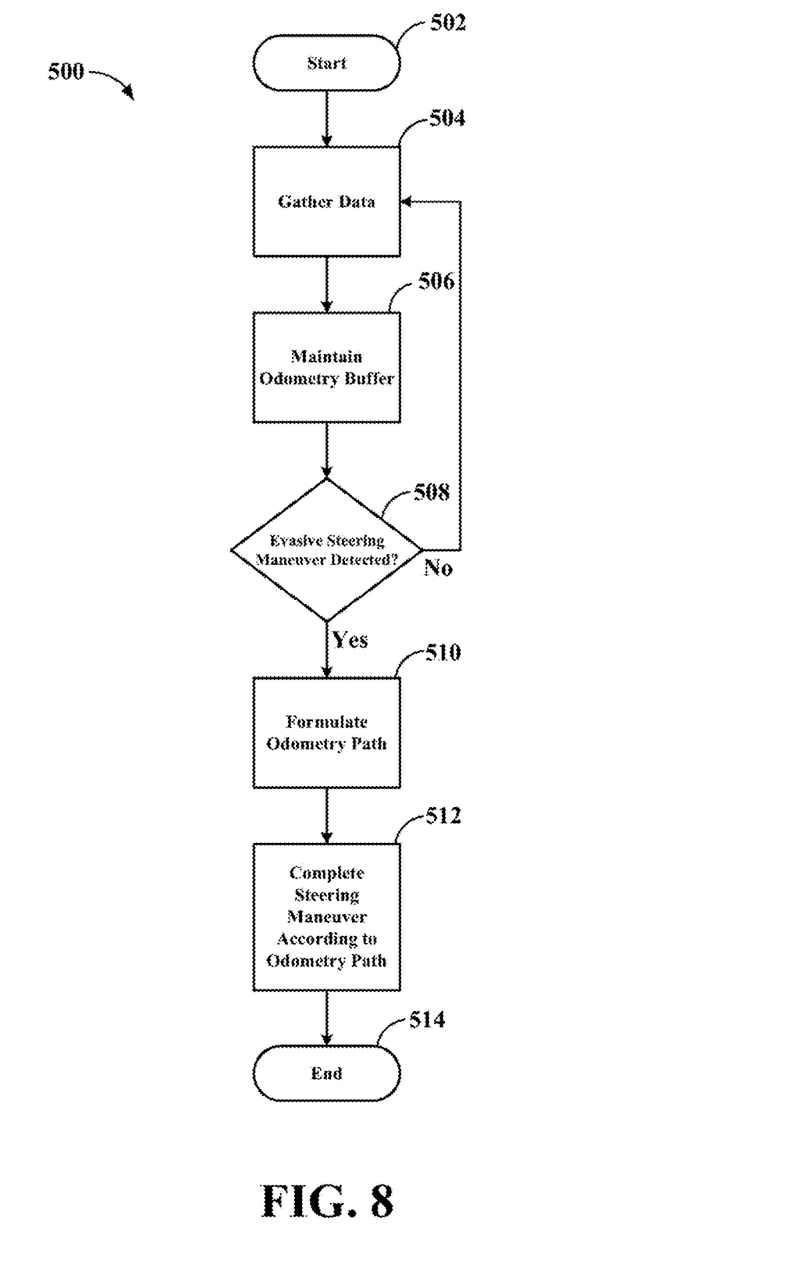
FIG. 8 is a flow diagram showing operations of the vehicle management system of FIG. 2.

With reference to FIG. 8, a method 500 is provided for stabilizing the vehicle 100 upon initiation of an evasive steering maneuver using the odometry memory 200.

At 502, the method 500 is initiated. In practical terms, the method 500 is initiated when an operator starts the ignition of the vehicle 100.

At 504, sensor data 123 may be gathered through the sensor system 120. For instance, the ADAS sensor module 122c may continuously provide the vehicle pose 152 as the vehicle 100 travels or is at rest.

At 506, the odometry memory 200 and, more particularly, the odometry buffer 202 may be maintained with the vehicle pose 152 so that it can be referenced by the computing system 130 if an evasive steering maneuver is detected.

At 508, if an evasive steering maneuver is initiated, whether it be by the driver or automated by the vehicle 100, the method 500 will proceed to 510. The vehicle 100 will continue to collect data at 504 and maintain the odometry buffer at 306 until an evasive steering maneuver is detected.

At 510, the odometry path 214 may be formulated using the relative pose 210 of the vehicle 100 so that the final heading 212c aligns with the relative heading 206c that is relative to the initial heading 204c.

At 512, the vehicle 100 maintains stability and completes the evasive steering maneuver according to the odometry path 214.

At 514, the method 500 ends.

A number of implementations have been described. Nevertheless, it will be understood that various modifications may be made without departing from the spirit and scope of the disclosure. Accordingly, other implementations are within the scope of the following claims.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A computer-implemented method that, when executed by data processing hardware, causes the data processing hardware to perform operations comprising:
   determining vehicle pose data of a host vehicle;
   maintaining an odometry buffer with the vehicle pose data;
   detecting a steering maneuver of the host vehicle;
   determining a relative pose of the host vehicle upon initiation of the steering maneuver using the odometry buffer;
   formulating an odometry path for aligning a heading of the host vehicle with a heading of the relative pose; and
   completing the steering maneuver according to the odometry path.

2. The method of claim 1, wherein gathering vehicle pose data further comprises a first state, a second state, and a third state of the host vehicle.

3. The method of claim 2, wherein the first state is an x-position of the host vehicle, the second state is a y-position of the host vehicle, and the third state is a heading of the host vehicle.

4. The method of claim 1, wherein determining the relative pose comprises determining a heading of an initial pose of the host vehicle at a point in time prior to initiation of the steering maneuver.

5. The method of claim 1, wherein completing the steering maneuver according to the odometry path further comprises aligning the heading of the host vehicle with the heading of the relative pose.

6. The method of claim 1, wherein maintaining the odometry buffer further comprises updating the odometry buffer according to a fail-operational mode due to hardware failure, sensor failure, or software failure.

7. The method of claim 6, wherein updating the odometry buffer according to the fail-operational mode comprises updating the odometry buffer with sensor data directly from a sensor system.

8. A vehicle management system comprising:
   an advanced driver assistance system including a trajectory control module associated with path planning and a steering control module;
   data processing hardware; and
   memory hardware in communication with the data processing hardware, the memory hardware storing instructions that, when executed on the data processing hardware, cause the data processing hardware to perform operations comprising:
   determining vehicle pose data of a host vehicle;
   maintaining an odometry buffer with the vehicle pose data;
   detecting a steering maneuver of the host vehicle;
   determining a relative pose of the host vehicle upon initiation of the steering maneuver using the odometry buffer;
   formulating an odometry path for aligning a heading of the host vehicle with a heading of the relative pose; and
   completing the steering maneuver according to the odometry path.

9. The vehicle management system of claim 8, wherein gathering vehicle pose data further comprises a first state, a second state, and a third state of the host vehicle.

10. The vehicle management system of claim 9, wherein the first state is an x-position of the host vehicle, the second state is a y-position of the host vehicle, and the third state is a heading of the host vehicle.

11. The vehicle management system of claim 8, wherein determining the relative pose comprises determining a heading of an initial pose of the host vehicle at a point in time prior to initiation of the steering maneuver.

12. The vehicle management system of claim 8, wherein completing the steering maneuver according to the odometry path further comprises aligning the heading of the host vehicle with the heading of the relative pose.

13. The vehicle management system of claim 8, wherein maintaining the odometry buffer further comprises updating the odometry buffer according to a fail-operational mode due to hardware failure, sensor failure, or software failure.

14. The vehicle management system of claim 13, wherein updating the odometry buffer according to the fail-operational mode comprises updating the odometry buffer with sensor data directly from a sensor system.

15. A computer-implemented method that, when executed by data processing hardware, causes the data processing hardware to perform operations comprising:
   receiving sensor data from one or more wheel speed sensors and an inertial measurement unit of a host vehicle;
   maintaining an initial pose of the vehicle in an odometry buffer of an odometry memory;
   providing the initial pose to one or more modules for path planning of the host vehicle; and
   formulating an odometry path for stabilizing the host vehicle, the odometry path being formulated with a relative pose respective of the initial pose.

16. The method of claim 15, wherein maintaining the initial pose data further comprises a first state, a second state, and a third state of the host vehicle.

17. The method of claim 16, wherein the first state is an x-position of the host vehicle, the second state is a y-position of the host vehicle, and the third state is a heading of the host vehicle.

18. The method of claim 15, wherein formulating the odometry path further comprises localizing a breadcrumb path to a coordinate frame of the host vehicle.

19. The method of claim 18, further comprising transforming the breadcrumb path from a target vehicle to the host vehicle.

20. A system comprising:
   data processing hardware; and
   memory hardware in communication with the data processing hardware, the memory hardware storing instructions that, when executed on the data processing hardware, cause the data processing hardware to perform operations comprising:
   determining vehicle pose data of a host vehicle;
   maintaining an odometry buffer with the vehicle pose data;
   detecting a steering maneuver of the host vehicle;
   determining a relative pose of the host vehicle upon initiation of the steering maneuver using the odometry buffer;

formulating an odometry path for aligning a heading of the host vehicle with a heading of the relative pose; and completing the steering maneuver according to the odometry path.

\* \* \* \* \*